United States Patent
McIntee et al.

(10) Patent No.: US 6,893,703 B2
(45) Date of Patent: May 17, 2005

(54) SAFETY BLANKET FOR ACCIDENT VICTIM

(76) Inventors: Jerome S. McIntee, P.O. Box 403, West Seneca, NY (US) 14224; Jon R. Kemp, 42 Jack Rd., Williamsville, NY (US) 14221

( * ) Notice: Subject to any disclaimer, the term of this patent is extended or adjusted under 35 U.S.C. 154(b) by 0 days.

(21) Appl. No.: 10/756,862

(22) Filed: Jan. 14, 2004

(65) Prior Publication Data
US 2004/0144684 A1 Jul. 29, 2004

Related U.S. Application Data

(62) Division of application No. 10/124,537, filed on Apr. 17, 2002, now Pat. No. 6,696,128.

(51) Int. Cl.$^7$ .................................................. B32B 5/26
(52) U.S. Cl. ................. 428/102; 428/474.4; 428/474.7; 428/475.2; 428/911
(58) Field of Search ................................ 428/102, 131, 428/911, 474.4, 474.7, 475.2

(56) References Cited

U.S. PATENT DOCUMENTS

| | | | | |
|---|---|---|---|---|
| 3,936,088 A | * | 2/1976 | Williams | 294/19.1 |
| 5,539,930 A | * | 7/1996 | Sesselmann | 2/243.1 |
| 5,770,530 A | * | 6/1998 | Nockemann et al. | 442/319 |

* cited by examiner

Primary Examiner—Alexander S. Thomas
(74) Attorney, Agent, or Firm—James C. Simmons

(57) ABSTRACT

A blanket which is placed over a person to protect the person from flying glass during extrication of the person from a vehicle involved in a collision. The blanket comprises at least one inner layer of pliable cut-resistant material and at least two outer layers of buffer material between which said inner layer is sandwiched so as to provide the feel and body of a blanket. A kit for use by rescue workers includes, in addition to the blanket, gloves for handling the blanket after use, a bio-hazard bag in which the used blanket is placed, and a carrying case for the blanket, gloves, and bio-hazard bag.

15 Claims, 2 Drawing Sheets

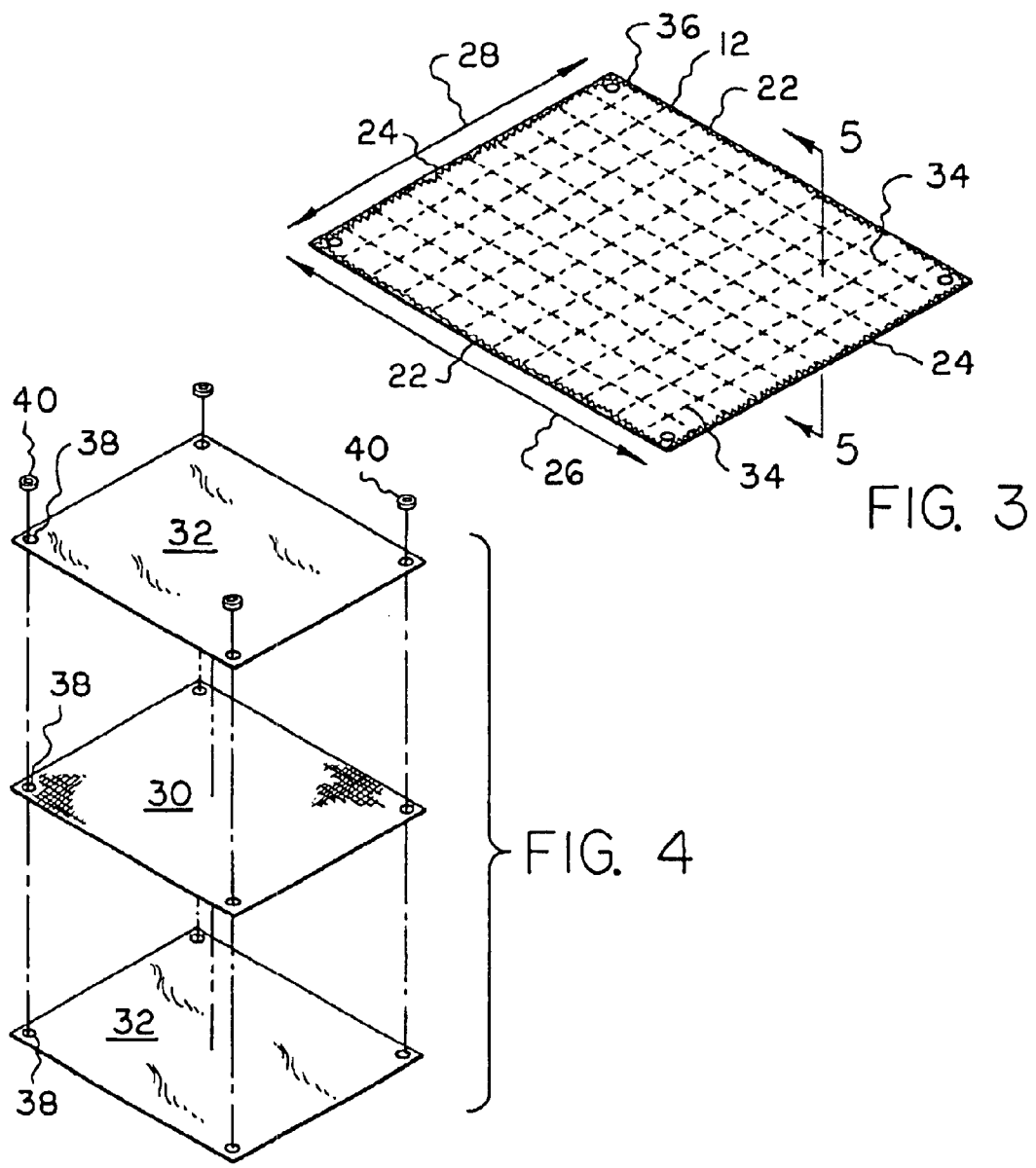
FIG. 3
FIG. 4
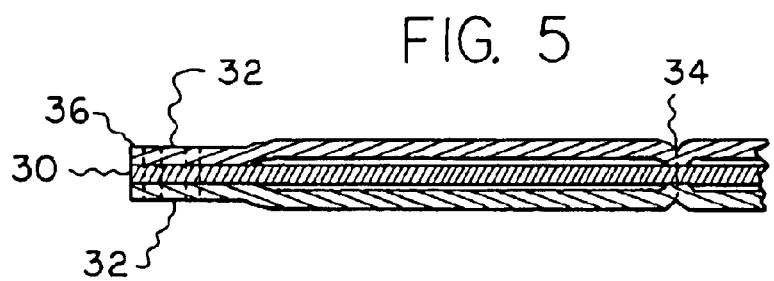
FIG. 5

SAFETY BLANKET FOR ACCIDENT VICTIM

This application is a divisional of application Ser. No. 10/124,537, filed Apr. 17, 2002 (now U.S. Pat. No. 6,696,128), the disclosure of which is incorporated by reference.

The present invention relates generally to the rescue of victims of vehicular accidents. More particularly, the present invention relates to a blanket for covering the victim to protect the victim from flying glass or other projectiles such as metal fragments during the process of extrication of the victim from the vehicle.

Currently, when it is necessary to break the windshield in order to remove the victim, rescue workers have covered the victim with rags, tarpaulins, household blankets, or whatever is available in order to protect the victim from flying glass. Needless to say, such coverings do not protect the victim as adequately as desired, i.e., they leave the victim still vulnerable to further injury.

U.S. Pat. No. 5,121,957, the disclosure of which is incorporated herein by reference, discloses a protective sheet of glass-impervious material which is applied adjacent the inside of the windshield of a vehicle to protect an accident victim if the windshield has to be broken to extricate the victim. Such a protective sheet is difficult to install and may not prevent all of the flying glass from reaching the victim.

U.S. Pat. No. 5,044,011, the disclosure of which is incorporated herein by reference, discloses body armor comprising (1) an outer shell of thin sheet material such as nylon, cotton, or Gortex, and (2) panels of bullet resistant material such as Kevlar or Lexan attached to the outer shell. Nylon and cotton undesirably allow pass-through contamination of bodily fluids, while Gortex material too easily rips as well as being expensive.

U.S. Pat. No. 6,102,128, the disclosure of which is incorporated herein by reference, discloses a soft fire-resistant blanket composed of fire-resistant organic fibers and other organic fibers which are compatible with human skin contact for use by a person escaping a fire.

Various ballistic materials have been used for protective garments, shields, and the like, such as bullet-proof vests, for example, as disclosed in U.S. Pat. Nos. 5,437,538; 5,536,553; 5,824,940; 5,327,811; 5,377,577; 5,887,453; and 6,161,462, the disclosures of which are incorporated herein by reference.

It is an object of the present invention to provide a blanket which adequately and comfortably protects a person being extricated from a vehicle involved in a collision from flying glass and the like.

It is another object of the present invention to provide such a blanket which which does not allow pass-through of bodily fluids so that rescue workers are protected.

In order to provide protection comfortably of a person from flying glass and the like during extraction from a vehicle involved in a collision, a quilted blanket is provided which includes a layer of pliable material having a cut resistance of at least about 0.9 kg sandwiched between layers of durable pliable material.

The above and other objects, features, and advantages of the present invention will be apparent in the following detailed description of the preferred embodiment thereof when read in conjunction with the accompanying drawings wherein the same reference numerals denote the same or similar parts throughout the several views.

BRIEF DESCRIPTION OF THE DRAWINGS

FIG. 3 is a perspective view of the blanket, unfolded.

FIG. 4 is an exploded view of the blanket.

FIG. 5 is a sectional view thereof taken along lines 5-5 of FIG. 3.

DETAILED DESCRIPTION OF THE PREFERRED EMBODIMENT

Figure 1:
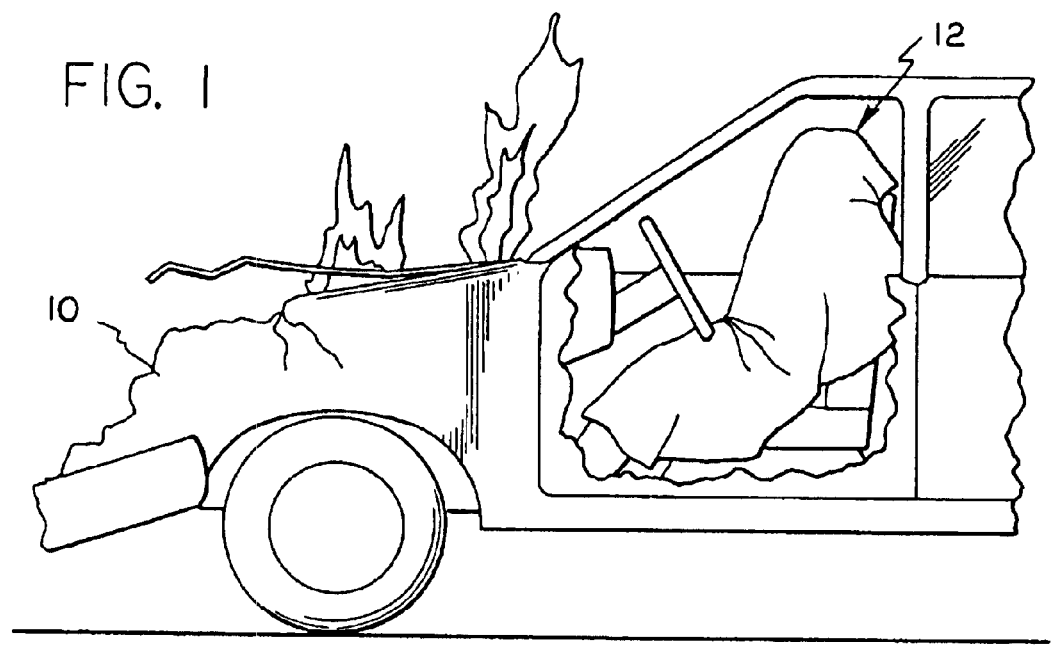
FIG. 1 is a perspective view of a portion of a vehicle after a collision, with parts broken away to show a person in the vehicle being covered by a blanket which embodies the present invention.

Referring to FIG. 1, there is shown at 10 a vehicle which has been involved in a collision and from which it is necessary to extricate the driver. In order to do so, it may be necessary to break the windshield. In order to protect the person from flying glass when the windshield is broken or otherwise by flying metal particles or the like, the person is shown to be protectively covered by a blanket, illustrated generally at 12.

Figure 2:
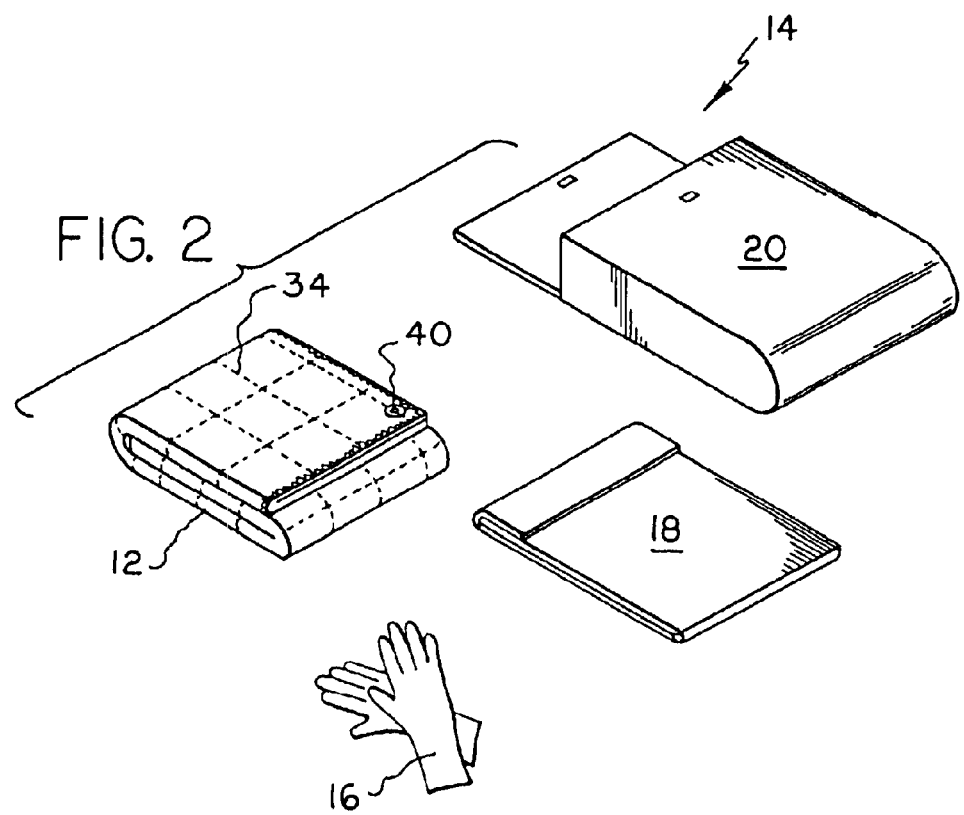
FIG. 2 is a perspective view of components of a kit, including the blanket, folded, for use by rescue workers.

Referring to FIG. 2, there is shown generally at 14 a kit including the blanket 12 for use by rescue workers during extrication of a person from a vehicle involved in a collision. The kit 14 includes, in addition to the blanket 12, a pair of suitable gloves 16 for use by the rescue workers for handling the blanket 12 after its use, a suitable bio-hazard bag 18 for placement of the blanket 12 and gloves 16 after their use, and a suitable carrying case 20 for the blanket 12, gloves 16, and bio-hazard bag 18. The carrying case 20, gloves 16, and bio-hazard bag 18 may be of any suitable conventional design.

Referring to FIGS. 3 to 5, the blanket 12 is shown to be generally rectangular, with a pair of side edges 22 extending between a pair of end edges 24, thereby defining a length and a width, illustrated at 26 and 28 respectively. However, the blanket 12 may be square or otherwise suitably shaped. The blanket 12 includes at least one inner layer 30 sandwiched between outer layers 32. While two outer layers 32 are shown, it should be understood that the blanket may contain more than two outer layers.

In accordance with the present invention, the inner layer 30 is composed of a suitable cut-resistant material in order to protect a person being extricated from the vehicle 10 from being injured by flying glass particles or the like which may otherwise penetrate the blanket 12. An ASTM test method (ASTM standard 1790-97) known as the Cut Protection Performance Test (CPPT) Method is used to determine cut resistance of a piece of fabric. In accordance with this test, a cutting edge is moved across the fabric several times each time under a different load and each time a measurement of the distance of travel of the cutting edge to cut through is made. The loads and corresponding distances are graphed to determine the load (reference load) required to cut through the fabric at 25 mm. The reference load is a measure of cut resistance. Cotton, leather, and latex work gloves have been tested and found to have cut resistances in the neighborhood of about 0.1 to about 0.6 kg, cotton having the best cut resistance. Cotton (as well as leather and latex) has inadequate cut resistance for use in the inner layer of the blanket of the present invention. On the other hand, a medium weight (14 oz. per square yard) Kevlar material is considered to have a cut resistance which is suitable for the inner layer 30. Testing showed this Kevlar material (in a work glove) to have a cut resistance of about 0.9 kg, and work gloves made of heavier Kevlar material were found to have higher (better) cut resistance. Therefore, in accordance with the present invention, the material of the inner layer 30 has a cut resistance, under the ASTM CPPT method, of at least about 0.9 kg. By the term "cut-resistant", as used herein and in the claims, is thus meant a cut resistance of at least about 0.9 kg.

A heavy weight (20 oz. per square yard) Kevlar material has been found to have a cut resistance between 1.3 and 1.4 kg (about 1.3 kg). Kevlar Plus material (also 20 oz. per square yard) has been found to have an even better cut resistance of about 1.6 kg. Thermobest material (described hereinafter) has been found to have an even better cut resistance of about 4 kg. These better cut resistance materials (especially the Thermobest material, as described hereinafter) are also considered to be suitable materials for the inner layer 30. Thus, more preferably, the cut resistance of the material of the inner layer 30 is at least about 1.3 kg, even more preferably at least about 4 kg.

The inner layer 30 is preferably composed of Keviar material having a weight of at least about 14 oz. per square yard, more preferably, at least about 20 oz. per square yard. Kevlar fiber, which also desirably has a fire resistance up to a temperature of about 650 degrees F., is a type of fiber of the class of aromatic polyamides or aramids (more specifically, a p-aramid) which is marketed by E.I. DuPont de Nemours and Company of Wilmington, Del. Kevlar Plus material, which contains Keviar fibers, is also marketed by E.I. DuPont de Nemours and Company of Wilmington, Del. The term "Kevlar material" is meant to include, for the purposes of this specification and the claims, blends of Kevlar and other fibers which blends have a cut resistance of at least about 0.9 kg., and including Kevlar Plus material.

More preferably, the inner layer 30 is composed of a Kevlar blend fiber material which is marketed by National Safety Apparel, Inc. of Cleveland, Ohio under the name Thermobest material (see page 3 of Safety Clothing and Accessories, a brochure of National Safety Apparel, Inc.), which has been found to have a cut resistance of about 4 kg and which also desirably has a pliancy which allows use of the material in a blanket, i.e., so that the blanket may be easily folded and folded about one's body and which also desirably provides good fire resistance, i.e., up to a temperature of about 800 degrees F.

Examples of other suitable cut-resistant materials for inner layer 30 are Thermobest Plus material (higher percentage of Kevlar fiber than Thermobest material for better abrasion resistance), Norbest 822 material (a blend of PBI (polybenzimidazole) and Kevlar fibers), Norbest 845 material (heavier blend of PBI and Kevlar fibers than Norbest 822 material), and Keybest material (100 percent Kevlar twill for superior cut and abrasion resistance) all of which are also marketed by National Safety Apparel, Inc. Another example of a suitable cut-resistant material for inner layer 30 is ballistic Kevler material such as disclosed in the aforesaid U.S. Pat. No. 5,437,538, which is incorporated herein by reference.

It is also desirable that the material of the inner layer 30 exhibit good puncture resistance, which all of the above inner layer materials have.

Materials such as those listed above which are suitable for the inner layer are normally rough to the touch, not aesthetically pleasing, and may be flimsy so that they do not have the feel and comfort of a blanket. In addition, grommets can not be easily and securely secured to such an inner layer 30 by itself.

Plexiglass is not suitable for either of the inner or outer layers because it is too rigid. Nylon and cotton are not suitable for the outer layers (as well as the inner layer) because they are too absorbent (can easily absorb body fluids). Gortex material is not suitable for the outer layers because it is easily ripped and therefore not sufficiently durable.

In order to provide a buffer between the inner layer 30 and a person to be protected while also affording the aesthetically pleasing appearance and comfort of a blanket, also in accordance with the present invention, each of the outer layers 32 is composed of a suitable buffer material, i.e., a pliable material having a softness and body to provide the feel of a blanket. The buffer material of the outer layers 32 is preferably durable (can withstand repeated washings without ripping or tearing so that it can be re-cycled, i.e., reused after it becomes contaminated and can also securely receive grommets attached thereto) and is preferably resistant to pass-through contamination (absorbancy) of body fluids so that rescue workers may be protected from disease pathogens of vehicle accident victims. The material of the outer layers 32 may also desirably provide some additional cut-resistance as well as fire resistance. A preferred buffer material for the outer layers 32 is Nomex material, an aramid material which has good fire and cut resistance and which is marketed by E.I. DuPont de Nemours and Company of Wilmington, DE. Examples of other suitable materials for outer layers 32 are P84 material (which is a spun m-aramid fiber material with a multi-lobal cross-section marketed by Inspec Fibres GmbH of Lensing, Austria), Basofil material (which is a melamine fiber material marketed by BASF Aktiengesellschaft of Germany), Advance material (which is a blend of 40% Nomex material and 60% Kevlar material and which is marketed by Southern Mills, Inc. of Union City, Ga.), and Millenia material (which is a blend of 40% Zylon material and 60% Technora material and which is also marketed by Southern Mills, Inc.). Zylon material is a polyphenylene-2,6-benzobisoxazole material manufactured by Toyobo. Technora material is a p-aramid material manufactured by Teijin. Kevlar fibers may be blended into any of the above materials to provide increased cut resistance to the buffer layers 32 but in a small enough amount that the softness and body of the buffer layers 32 as discussed above are suitably maintained.

In order to prevent bunching of the blanket 12 so that it does not fall apart but has continuity and so that it has a comfortable and pleasing feel and appearance and is pliable and easily foldable, in accordance with the present invention, the blanket 12 is quilted, i.e., by "quilted" is meant stitching of the layers 30 and 32 together at spaced intervals over both the length and width of the blanket, the spacings between lines, illustrated at 34, of stitching being, for example, about 6 inchs (straight line stitching, as shown in FIG. 3, making folding of the blanket easier). The stitching also makes repair easier, i.e., a new square may be put in and stitched along the same lines as the old square which is removed. The outer edges of the blanket 12 are serged (a form of stiching), as illustrated at 36.

In order to permit the blanket 12 to be easily hung up and cleaned, a hole, illustrated at 38, is provided through the layers 30 and 32 in each corner of the blanket 12 and a grommet 40 secured in each of the holes 38.

After use of the blanket 12, it should, especially if contaminated with glass particles, body fluids, or the like, be put in the bio-hazard bag 18 and sent to a business called a bio-cleaner or extractor for cleaning and re-use.

It should be understood that, while the present invention has been described in detail herein, the invention can be embodied otherwise without departing from the principles thereof, and such other embodiments are meant to come within the scope of the present invention as defined by the appended claims.

What is claimed is:

1. A method of protecting a person from flying glass during extrication of the person from a vehicle involved in a collision, the method comprising placing over the person a protective blanket having a plurality of layers of material including at least one inner layer of pliable cut-resistant material and outer-most layers of pliable buffer material between which the at least one inner layer is sandwiched, the buffer material being different from the cut-resistant material and having a softness and body providing the feel of a blanket.

2. A method according to claim 1 wherein the inner and outer-most layers are quilted together.

3. A method according to claim 1 wherein edges of the blanket are serged.

4. A method according to claim 1 wherein the blanket has at least one grommet.

5. A method according to claim 1 further comprising placing the blanket in a bio-hazard bag.

6. A method according to claim 1 further comprising cleaning the blanket for re-use.

7. A method according to claim 1 wherein the inner layer material has a cut resistance of at least about 1.3 kg.

8. A method according to claim 1 wherein the inner layer material has a cut resistance of at least about 4 kg.

9. A method according to claim 1 wherein the inner layer is composed of an aromatic polyamide or aramid material having a weight of at least about 14 oz. per square yard.

10. A method according to claim 1 wherein the inner layer is composed of an aromatic polyamide or aramid material having a weight of at least about 20 oz. per square yard.

11. A method according to claim 1 wherein the outer-most layers are composed of an m-aramid material.

12. A method according to claim 11 wherein the inner layer is composed of an aromatic polyamide or aramid material having a weight of at least about 14 oz. per square yard.

13. A method according to claim 11 wherein the inner layer is composed of an aromatic polyamide or aramid material having a weight of at least about 20 oz. per square yard.

14. A method according to claim 11 wherein the inner layer is composed of an aromatic polyamide or aramid material which has a cut resistance of at least about 4 kg.

15. A method according to claim 11 wherein the inner layer material has a cut resistance of at least about 4 kg.

* * * * *